United States Patent [19]

Ratton et al.

[11] 4,275,003

[45] Jun. 23, 1981

[54] PREPARATION OF AROMATIC AZOAMINES BY DIAZOTIZATION/COUPLING/REARRANGEMENT OF AROMATIC AMINES

[75] Inventors: Serge Ratton, La Verpilliere; Bernard Botannet, Luzinay, both of France

[73] Assignee: Rhone-Poulenc Industries, Paris, France

[21] Appl. No.: 876,504

[22] Filed: Feb. 9, 1978

[30] Foreign Application Priority Data

Feb. 11, 1977 [FR] France ............................ 77 04638

[51] Int. Cl.³ .................. C07C 107/06; C07C 107/08; C09B 29/085; C09B 29/095
[52] U.S. Cl. .................................... 260/205; 260/144; 260/196
[58] Field of Search ............... 260/141 R, 141 P, 142, 260/205, 206, 207, 207.1, 196, 144

[56] References Cited

U.S. PATENT DOCUMENTS

| | | | |
|---|---|---|---|
| 2,538,431 | 1/1951 | Shulman | 260/205 |
| 2,622,078 | 12/1952 | Klaassens et al. | 260/141 |
| 2,809,964 | 10/1957 | Baggenstoss et al. | 260/205 |
| 3,380,988 | 4/1968 | Rigaudy | 260/142 |
| 3,423,391 | 1/1969 | Windler et al. | 260/141 |
| 4,018,751 | 4/1977 | Trecek | 260/205 |
| 4,020,051 | 4/1977 | Herkes | 260/141 |
| 4,020,052 | 4/1977 | Detrick | 260/141 |

FOREIGN PATENT DOCUMENTS

580083  7/1959  Canada ........................... 260/205

OTHER PUBLICATIONS

Kaeppler et al., Chemical Abstracts, vol. 76, #72205n (1972).

*Primary Examiner*—Floyd D. Higel
*Attorney, Agent, or Firm*—Burns, Doane, Swecker & Mathis

[57] ABSTRACT

Aromatic azoamines are prepared by diazotizing an aromatic amine, coupling the diazonium salt with the aromatic amine, and rearranging the resulting aromatic diazoamine. The several reactions are effected in single stage by introducing vaporous nitrogen oxides to a reaction medium essentially consisting of the aromatic amine $[\alpha]$, a salt of the aromatic amine $[\beta]$, and water $[\gamma]$, with the percentage weight relationship existing among the components $\alpha$, $\beta$ and $\gamma$ being such that:

$10 < \alpha < 70$ $13 < \beta$ $5 < \gamma$ $\alpha + \beta + \gamma = 100$

13 Claims, 2 Drawing Figures

PREPARATION OF AROMATIC AZOAMINES BY DIAZOTIZATION/COUPLING/REARRANGEMENT OF AROMATIC AMINES

BACKGROUND OF THE INVENTION

1. Field of the Invention

The present invention relates to a process for the preparation of aromatic aminoazo compounds by diazotizing an aromatic amine with vaporous oxides of nitrogen, by coupling the diazonium salt with an aromatic amine and by rearranging the aromatic diazoamino compound which is formed as an intermediate. The process according to the invention is especially well adapted to the preparation of p-aminoazobenzene from aniline.

2. Description of the Prior Art

Processes for the preparation of aromatic aminoazo compounds from an aromatic amine are described in the literature. These processes have been carried out in a single or plural stage. Thus, according to Fierz-David [*Grundlegende Operationen der Farbenchemie* (Principal Operations in Dyestuff Chemistry), 8th edition, 1952, pages 265-6], p-aminoazobenzene is obtained in three stages from aniline, by first diazotizing aniline at a low temperature, then by coupling the diazonium salt with aniline and by separating diazoaminobenzene [or triazene], in the solid state, after precipitation; in a final stage, the triazene is rearranged into p-aminobenzene by dissolving the triazene in aniline and adding aniline hydrochloride thereto.

Attempts have subsequently been made to obtain the aromatic aminoazo compounds by reducing the number of stages and by carrying out the process under conditions in which the diazonium salt and/or the triazene were converted directly in the medium as they were formed. Thus, in East German Pat. No. 77/985 it has been recommended to carry out all three stages simultaneously by injecting hydrochloric acid into a mixture of aniline, water and sodium nitrite, which has been heated to a temperature about 50° C. and generally of about 100° C. This process is carried out at a high temperature in the presence of relatively large amounts of water. A certain number of disadvantages result, one of which, in particular, is a lowering of the yield of p-aminoazobenzene through by-production of a relatively large amount of o-aminoazobenzene.

Aminoazobenzene hydrochloride has also been successfully obtained in a single stage from aniline, by use of an alcohol, having at most three carbon atoms, under very specific conditions of concentration. This technique is described in U.S. Pat. No. 2,538,431. However, the presence of an alcohol favors the secondary reactions and increases the complexity of the process. The reaction must also be permanently monitored in order to prevent the formation and accumulation, in the medium, of an alkyl nitrite, the latter being well known for its instability.

French Pat. No. 1,192,374 to Goodrich describes a two-stage process for the preparation of an aromatic aminoazo compound, and essentially of p-aminoazobenzene, by adding nitrite, at between 0° and 50° C., to a reaction medium comprising aniline, aniline hydrochloride and water in proportions such that there are from 2.5 to 12 mols of aniline and 1.03 to 2.5 molecular equivalents of acid per mol of nitrite employed. The diazoaminobenzene is rearranged into aminoazobenzene in a second stage carried out at between 40° and 75° C.; the rearrangement reaction is preferably carried out in the presence of a Lewis acid. The Lewis acid accelerates the rearrangement process. This process, which requires that two stages be carried out at different temperatures, makes it possible to obtain p-aminoazobenzene with a yield of the order of 90%, the reaction generally taking one or several hours. In this process, the use of aluminium chloride leads to significant complications from a technical point of view, and the conversion ratio of the triazene is not quantitative; aminoazobenzene containing a small amount of triazene is therefore obtained upon completion of the reaction, which constitutes, on the one hand, a loss in yields, and, on the other hand, a considerable disadvantage as regards the purification of the p-aminoazobenzene.

Other techniques have proposed to first prepare the diazonium salt or the triazene and to convert the latter into an aromatic aminoazo compound in a single stage. Thus, K. H. Meyer [*Berichte*, 54, 2,265-2,272 (1921)]has described the possibility of obtaining p-aminoazobenzene from a benzenediazonium halide and aniline hydrochloride by adding acetic acid and a concentrated aqueous solution of sodium formate; however, the yields are low.

It has also been shown that it is possible to obtain p-aminoazobenzene directly from benzenediazonium chloride and aniline, when aniline hydrochloride and the diazonium chloride are reacted in an aqueous medium containing free hydrochloric acid. However, this is an excessively slow reaction which is carried out in a homogeneous medium and gives a very poor yield [H. V. Kidd, *Journal of Organic Chemistry*, 2, 192-207 (1937)].

Finally, Goldsmith [*Zeitschrift fü IÖäÖïïü ÏüÖü* 110, 251-265 (1924)] has proposed to convert triazene into p-aminoazobenzene in a medium essentially comprising aniline and containing small amounts of aniline hydrochloride and, optionally, small amounts of water. It was shown that the presence of water decreased the rate of the rearrangement reaction.

From the chemical literature, it is thus found that it is the rearrangement reaction which appears to be the slow and incomplete reaction of all the diazotization, coupling and rearrangement reactions. However, attempts have been made to activate this rearrangement reaction, either by adding catalysts [technique of French Pat. No. 1,192,374], or by carrying out the reaction in the presence of very well defined amounts of an aliphatic alcohol having at most three carbon atoms [process described in U.S. Pat. No. 2,538,431]. However, these techniques have not made it possible to carry out a rapid and total conversion of the aromatic diazoamino compound into the aromatic aminoazo compound with quantitative yields.

French Pat. No. 2,306,977 to American Cyanamid describes a process for the preparation of an aromatic aminoazo compound by mixing in a tubular reactor a first stream of reagents containing a great excess of aromatic amine, a mineral acid in stoichiometric excess, and water, with a second stream consisting of an aqueous solution of alkali nitrite. Thus, in good yields, and with kinetic rapidity, the aromatic aminoazo compound is prepared. Nonetheless, certain inorganic compounds, e.g., salts such as sodium chloride, are also obtained in stoichiometric proportion. The presence of such, e.g., salts, typically effects heterogeneity in the medium which reduces the conversion of the reaction intermediates. It too is necessary, in order to limit pollution, to separate and purify inorganic compounds.

SUMMARY OF THE INVENTION

A process for the preparation of aromatic aminoazo compounds has now unexpectedly been found, such process defining the primary object of this invention, in which an aromatic amine is diazotized with vaporous oxides of nitrogen, the diazonium salt is coupled with the aromatic amine, and the aromatic diazoamino compound is then rearranged, which process enables conducting all the reactions in but a single stage, without the need for catalyst addition and with rapid reaction kinetics, and during which reaction the aromatic diazoamino compound is totally converted into the aromatic aminoazo compound with quantitative yields. More precisely, the present invention relates to a process for the preparation of aromatic aminoazo compounds by diazotizing an aromatic amine, by coupling the diazonium salt with the aromatic amine and by then rearranging the aromatic diazoamino compound, characterized in that the vaporous oxides of nitrogen are introduced via a medium essentially consisting of the aromatic amine, a salt of the aromatic amine and water, the various percentages by weight in the reaction medium of these three constituents, denoted as $\alpha$, $\beta$ and $\gamma$, respectively, being such that the following relationships are observed at any time during the reaction:

$10 < \alpha < 70$ $13 < \beta$ $5 < \gamma$ $\alpha + \beta + \gamma = 100$

The medium in which the reaction is carried out generally comprises a single liquid phase, this liquid phase being organic in nature and consisting essentially of the aromatic amine, the salt of the aromatic amine and water.

In addition, the reaction medium is not necessarily a liquid medium; it can optionally contain a dispersed solid phase comprising the salt of the aromatic amine.

DETAILED DESCRIPTION OF THE INVENTION

The process according to the invention will now be described more precisely with reference to the production of p-aminoazobenzene from aniline, or from one of its intermediates.

One of the objects of the present invention is, therefore, a process for the preparation of p-aminoazobenzene by diazotizing aniline, by coupling the diazonium salt with aniline and by rearranging the diazoaminobenzene which is formed as an intermediate, the salient feature of the subject process comprising a reaction medium consisting of aniline, aniline hydrochloride and water, and wherein the percentages by weight, $\alpha$, $\beta$ and $\gamma$, have values such that at all times during the reaction, the following relationship is observed:

$10 < \alpha < 70$ $13 < \beta$ $5 < \gamma$ $\alpha + \beta + \gamma = 100$

Within the above defined range of concentrations, the rearrangement reaction is found to be complete in a total time which is generally much less than 2 hours at 50° C. If a relatively small proportion of aniline is used [for example, less than 45%], it is desirable to slightly increase the threshold of the minimum proportion of hydrochloride. For proportions of aniline of about 10%, it has been observed that advantageous results are obtained when the proportion of aniline hydrochloride is not less than 18% throughout the entire reaction.

Figure 1:
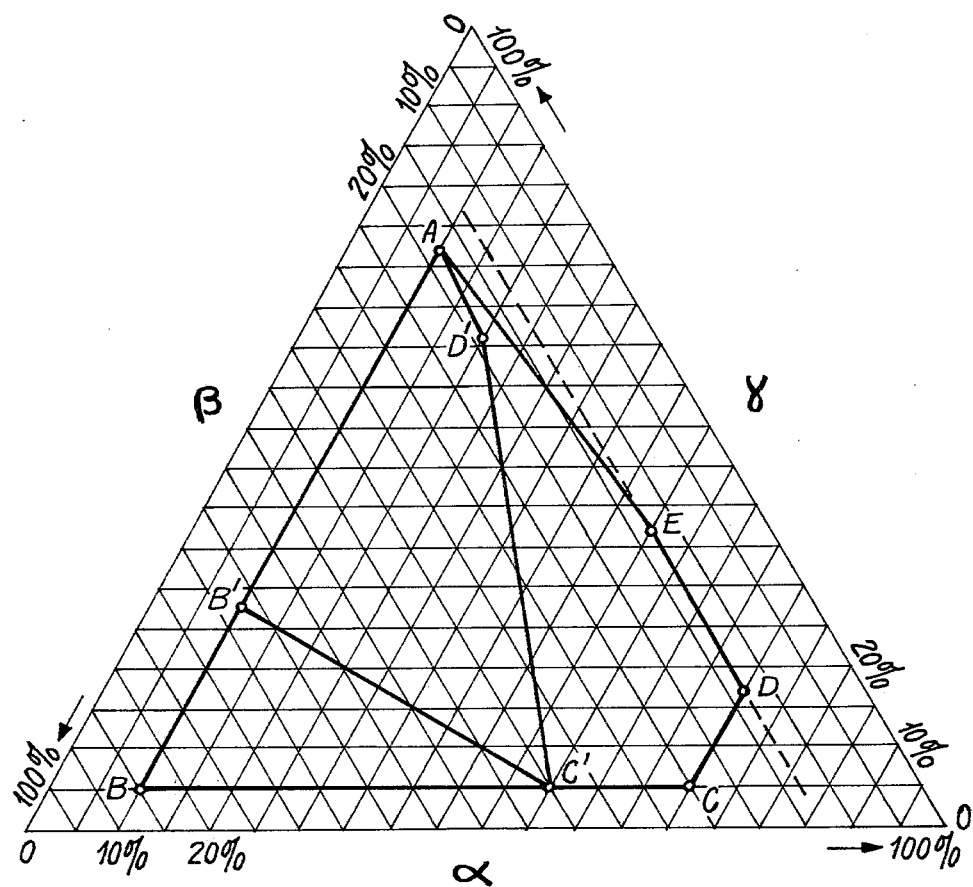
FIG. 1 is a ternary diagram illustrating certain reactant ratios according to the process of the invention.

A point M can thus be defined on a ternary diagram by its three coordinates $\alpha$, $\beta$ and $\gamma$. In accordance with the immediately pregoing, good results will be obtained when the point M is situated, throughout the entire reaction, inside that area of the diagram of FIG. 1 which is bounded by the points A, B, C, D and E. Excellent results will be obtained, both from the point of view of kinetics as well as from the point of view of the yields, when the point M is situated inside the area bounded by the points A, B', C' and D' on the diagram of FIG. 1. The precise coordinates of the various points of the diagram are given the table which follows:

|   | A | B | C | D | E | B' | C' | D' |
|---|---|---|---|---|---|----|----|----|
| $\alpha$ | 10 | 10 | 70 | 70 | 50 | 10 | 55 | 20 |
| $\beta$ | 18 | 85 | 25 | 13 | 13 | 62 | 40 | 19 |
| $\gamma$ | 72 | 5 | 5 | 17 | 37 | 28 | 5 | 61 |

It is obviously apparent that the point M changes as the reaction progresses, when the vaporous oxides of nitrogen nitrous vapors are introduced into the medium comprising aniline, aniline hydrochloride and water. For convenience, this medium will subsequently be denoted as the ternary mixture. The change in the point M is connected, on the one hand, to the aniline and aniline hydrochloride consumed, and, on the other hand, to the increase in the amount of water, the latter originating from the reaction.

The additional amounts of water originating from the reaction are also calculated. If the resulting point M' is outside the areas defined above, it suffices to reduce the amount of water added initially, so as to bring the point M' inside this area.

The nitrogen oxide vapors which can be used may be nitric oxide NO and/or nitrogen peroxide $NO_2$ [or $N_2O_4$] and/or nitrogen trioxide $N_2O_3$, in varying proportions. The nitrogen oxide vapors in all cases permit obtaining the aromatic aminoazo compounds in practically quantitative yield. The composition of the nitrogenous vapors in any event displays a sensitive influence on the kinetics of the reaction and on the total consumption of said vapors. Preferably, there is employed in the reaction $N_2O_3$ or mixtures such as NO, $N_2O_3$ [NO being the carrier vehicle for liquified $N_2O_3$], or mixtures such as NO, $NO_2$ [NO being the carrier vehicle of liquified $NO_2$, the molar ratio of NO in the mixture being between 1 to 200 and preferably between 2 to 100]. The mixture NO, NO$_2$ can be obtained from O$_2$ and NO.

It is possible to dilute the vapors of the nitrogen oxides with an inert gas such as nitrogen. One can readily obtain diluted nitrogenous vapors by mixing air and NO.

The amount of the nitrogenous vapors which is introduced must be neither too small, for obvious reasons of profitability, nor too large, because of the risk that secondary reactions might develop. As a general rule, the amount of vapors which is introduced is such that for a reaction mixture consisting of an overall total of 1000 g of aniline, aniline hydrochloride and water, from 0.05 to 1 and preferably from 0.1 to 0.6 equivalent of diazotizing agent is introduced. This equivalent of diazotizing agent, hereinafter the D.A., is variable according to the nature of the vapors of the nitrogen oxides. For one mole of NO, NO$_2$ and N$_2$O$_3$, the D.A. is respectively ½; ½ and 2. According to the mixture used, the D.A. for one total mole is comprised between ½ and 2. The mixture NO, NO$_2$ containing a large proportion of the NO is evidently equivalent to the mixture NO, N$_2$O$_3$.

When the point M is situated in the preferred zone of the diagram, large amounts of nitrogenous vapors can be used, these amounts being greater than 0.5 D.A. per 1,000 g of mixture, without the risk of secondary reactions occurring. This aspect is very important from an industrial point of view, because it leads to a high productivity for a given reactor.

The molar ratios of aniline/D.A. and aniline hydrochloride/D.A. are preferably fixed within the ranges defined as follows:

$$5 < \frac{\text{aniline}}{D.A.} < 30$$

$$1 < \frac{\text{aniline hydrochloride}}{D.A.} < 30$$

At the completion of the reaction, the p-aminoazobenzene produced can be separated from the reaction medium by any known means, such as those described in French Pat. No. 1,192,374 and U.S. Pat. No. 2,538,431. The p-aminoazobenzene can be separated by distillation or by precipitation followed by recrystallization, either as the free base or in the form of the hydrochloride. After adding water to the reaction medium, an organic phase comprising aniline and p-aminoazobenzene can also be separated. This organic phase can be distilled in order to remove the aniline, and then the aminoazobenzene can be recrystallized from a solvent, for example, from petroleum ether.

The reaction mixture can also be extracted with an aliphatic or aromatic hydrocarbon such as benzene or toluene, which makes it possible to selectively separate the p-aminoazobenzene. An extraction process of this type comprises yet another object of the present invention, by way of means particularly suited for carrying out the process of the present invention.

Therefore, the present invention further relates to a process for the extraction of p-aminoazobenzene in a medium essentially comprising aniline, aniline hydrochloride and water, with the percentages by weight, $\alpha$, $\beta$ and $\gamma$, being according to the foregoing relationship; the extraction process is characterized in that the diazoaminobenzene is brought together with an aliphatic or aromatic hydrocarbon, the latter preferably being benzene or toluene. As a general rule, the amounts of aromatic hydrocarbon employed are such that the weight ratio of hydrocarbon, relative to the mass of the medium in which the diazoaminobenzene is present, is between 0.3 and 5, and preferably between 0.5 and 1. After extraction, the extract is distilled, in order to separate the solvent and distil the entrained aniline. The amount of amine entrained varies in accordance with the proportions of the various constituents of the medium in which the diazoaminobenzene is present.

The process, as defined above, can be carried out with aromatic amines other than aniline. Ortho-, meta- and paratoluidines, naphthylamines, halogen-containing anilines, and alkylanilines having from 1 to 2 alkyl groups which are not borne by the nitrogen and contain from 1 to 4 carbon atoms, can be used. It has also been found that, by establishing the following relationship in percentages by weight, $\alpha$, $\beta$ and $\gamma$, namely:

$$10 < \alpha < 70$$

$$13 < \beta$$

$$5 < \gamma$$

$$\alpha + \beta + \gamma = 100$$

it was possible to obtain a rapid and total conversion. However, the substitution of aniline by another aromatic amine can optionally lead to a slight readjustment of the boundaries defined above. As a general rule, good results will be obtained when the molar ratio of amine/amine hydrochloride is between 0.25 and 8, and preferably between 0.25 and 5, and when the molar ratios of amine/D.A. and amine salt/D.A. are within the ranges defined above in the description of the process carried out using aniline and aniline hydrochloride as the starting materials.

For reasons of convenience, the aromatic amine salt which can be used in the process of the present invention is generally the hydrochloride. However, aromatic amine salts other than the hydrochloride, such as the salts of hydrobromic acid, sulfuric acid [which requires the use of dilute acid in order to prevent sulfonation reactions], phosphoric acid and nitric acid, or also the salts of organic acids such as acetic acid, can obviously be used. A mixture of the salts of the above acids can also be employed, if desired.

It was observed that, by following the aforesaid $\alpha$, $\beta$ and $\gamma$ relationship, it was possible to obtain a rapid and total conversion.

Figure 2:
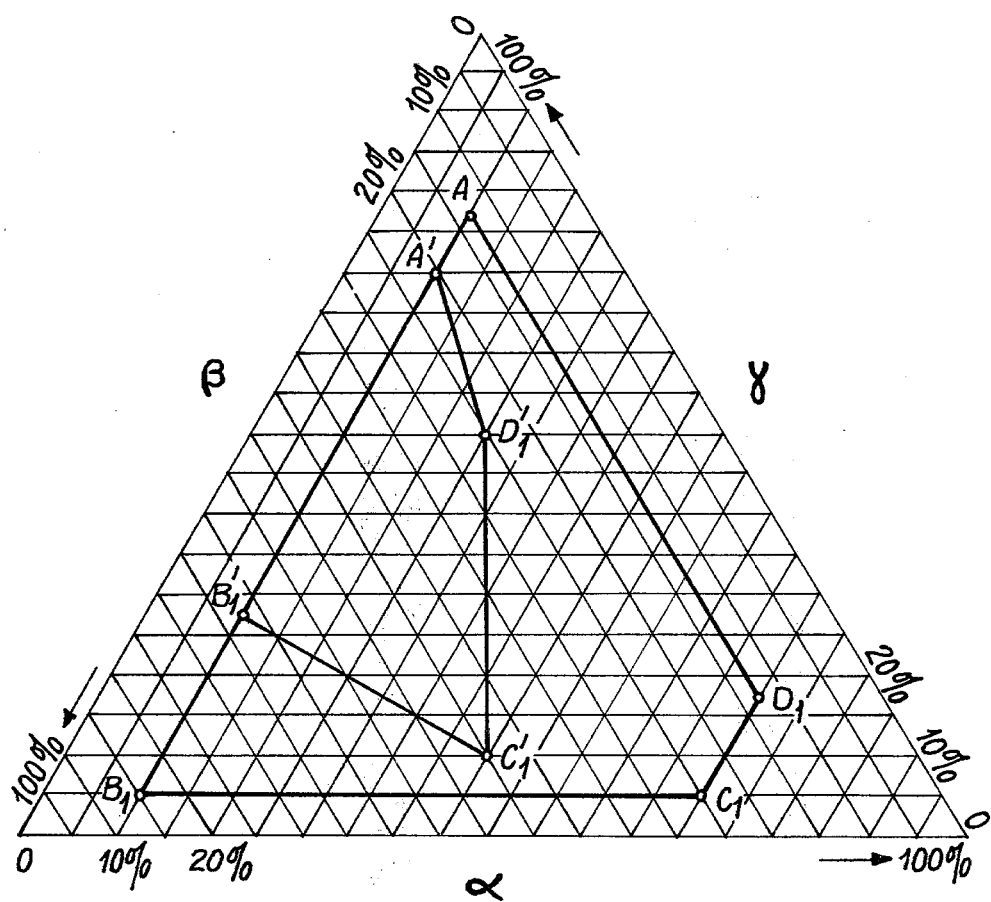
FIG. 2 is a ternary diagram illustrating certain other reactant ratios according to the invention.

However, the substitution of hydrochloric acid by another acid can optionally lead to a slight readjustment of the boundaries defined above. When nitric acid was used instead of hydrochloric acid, the preferred zone was determined, in which the point M must be situated in order to obtain excellent results, both from the point of view of kinetics and from the point of view of yields. This zone is bounded by the points $A'_1$, $B'_1$, $C'_1$ and $D'_1$ noted on the diagram of FIG. 2. The precise coordinates of the various points on the diagram are given in the table which follows:

|   | $A'_1$ | $B'_1$ | $C'_1$ | $D'_1$ |
|---|---|---|---|---|
| $\alpha$ | 10 | 10 | 45 | 25 |
| $\beta$ | 20 | 62 | 45 | 25 |
| $\gamma$ | 70 | 28 | 10 | 50 |

Furthermore, it should be noted that, as a general rule, good yields will be obtained for a given aromatic amine and for a given aromatic amine salt when the ratios of amine/amine salt, amine/D.A. and amine salt/D.A. are chosen within the ranges which were defined above in the description of the process carried out using an aromatic amine [aniline and the like] and an aromatic amine hydrochloride of the starting materials.

The process of preparation of aromatic aminoazo compounds according to the invention is generally carried out at temperatures of between 25° and 100°, and preferably between 30° and 60°. In the preferred zones, the total reaction time is well below 1 hour.

As has already been stated, the medium in which the rearrangement reaction of the aromatic diazoamino compound is carried out essentially comprises the aromatic amine, the aromatic amine salt and water. According to another embodiment of the present invention, small amounts of another substance, such as an alcohol, can optionally be added to the reaction medium comprising the aromatic amine, the aromatic amine salt and water, which substance does not fundamentally change the manner in which the process is carried out, and which complies with the main characteristic of the process, namely, that the percentage by weight relationship for $\alpha$, $\beta$ and $\gamma$, be followed.

However, the amounts of the compound which is optionally added are equal to at most 25% relative to the overall mass of aromatic amine, aromatic amine salt and water. The use of a compound such as an alcohol makes it possible to reduce the concentration of aromatic amine, while maintaining constant the concentration of aromatic amine salt.

This is advantageous for an industrial process because the amounts of aromatic amine to be recycled are reduced.

The process according to the invention is very important from an industrial point of view. It considerably simplifies the route to aromatic aminoazo compounds, which can be prepared in a single stage, starting from an aromatic amine, with a quantitative conversion ratio relative to the nitrogenous vapors employed and with a yield which is also quantitative, the total reaction time having been very significantly reduced relative to the processes of the prior art.

The process according to the invention avoids the formation of inorganic compounds, in contradistinction to that process employing nitrite and which thus produce alkali salts. The process according to the invention is much more simple from a technological point of view. The process is also less polluting; this is an undeniable advantage.

All of the foregoing could in no event have been forseen simply by substituting the nitrogenous vapors for the alkali nitrites.

The aromatic aminoazo compounds are very important from an industrial point of view; in accordance with the known processes, they can easily be converted into aromatic diamines by hydrogenation. Among the latter, the paradiamines, such as p-phenylenediamine, obtained starting from aniline and used in the production of high modulus polyamides, are of especial worth.

In order to further illustrate the present invention and the advantages thereof, the following specific examples are given, it being understood that the same are intended only as illustration and nowise limitative.

EXAMPLE 1

Into a ternary mixture consisting of, by weight, 40% aniline, 30% aniline hydrochloride and 30% water, the temperature of which being maintained at 50°, there were introduced 1.6 g of nitrogen peroxide $NO_2$ condensed in a trap with a stream of NO maintained at 25°, at a rate of 30 l/hour, for 25 minutes. NO escaping from the reactor was constantly recirculated. When the entire amount of $NO_2$ had been introduced, the reaction medium was maintained at 50° for 5 minutes. The mixture was neutralized with 2 N sodium hydroxide to liberate aniline and was then extracted with toluene. Toluene and aniline well removed by distillation of the extract; there were recovered 16.1 g of a red solid identified as p-aminoazobenzene having a purity of 99%. The yield of aminoazobenzene was 100% relative to the aniline converted and to the vaporous nitrogen oxides converted.

EXAMPLE 2

Example 1 was repeated in its entirety, but the treatment for the recovery of the aminoazobenzene was modified.

At completion of the reaction, the medium was extracted twice, directly with 150 and 100 cm³ of toluene, respectively. The toluene extracts were combined. The toluene and aniline were separated by distillation of 16 g of aminoazobenzene well isolated.

EXAMPLE 3

Example 1 was repeated in its entirety, but the treatment for the recovery of the aminoazobenzene was modified. The final reaction solution was subjected to steam distillation which made it possible to separate the aniline, the aminoazobenzene being recovered in the form of a solid which was dispersed in the aqueous solution of aniline hydrochloride. After filtration and drying, 16.1 g of aminoazobenzene were obtained.

EXAMPLES 4–9

Following the procedure outlined in the preceding examples, the parameters of the reaction were studied as follows:
[i] Composition of the ternary mixture [aniline, amine salt, water];
[ii] Molar proportion of the mixture of nitrogenous vapors;
[iii] Flow rate of NO;
[iv] Nature of nitrogenous vapors.

The results of the various experiments are set forth in the following Table I:

TABLE I

| Example | Composition of the initial ternary mixture in g. | | Nature of nitrogenous vapor | Amount of diazotizing agent | Composition of resultant ternary mixture | | Time of introduction of nitrogenous vapors | Yield relative to converted aniline |
|---|---|---|---|---|---|---|---|---|
| 4 | aniline | 69.3 | $NO + NO_2^x$ | | aniline | 19.5 | | |
| | hydrochloride | 125.4 | r = 23 | | hydrochloride | 43.6 | | |
| | water | 104 | recirculation | 1.6 g $NO_2$ | water | 36.9 | 40 mn | 98% |

TABLE I-continued

| Example | Composition of the initial ternary mixture in g. | | Nature of nitrogenous vapor | Amount of diazotizing agent | Composition of resultant ternary mixture | | Time of introduction of nitrogenous vapors | Yield relative to converted aniline |
|---|---|---|---|---|---|---|---|---|
| 5 | aniline hydrochloride water | 30 112.5 157.5 | NO 30 l/h NO + NO$_2$ r = 80 recirculation NO 30 l/h | 0.23 g NO$_2$ | analine hydrochloride water | 9.3 37.5 53.2 | 20 mn | 99% |
| 6 | aniline hydrochloride water | 165.9 124.5 28.6 | NO 30 l/h NO + NO$_2$ r = 30 recirculation NO 30 l/h | 1.6 g NO$_2$ | aniline hydrochloride water | 49.6 40.4 10 | 50 mn | 99% |
| 7 | aniline nitrate water | 68 28 4 | NO 30 l/h NO + NO$_2$ r = 60 recirculation NO 30 l/h | 0.8 g NO$_2$ | aniline nitrate water | 65 29.6 5.4 | 50 mn | 99% |
| 8 | aniline hydrochloride water | 80 60 60 | NO 30 l/h NO + NO$_2$ r = 30 recirculation NO 50 l/h | 1.6 g NO$_2$ | aniline hydrochloride water | 35.4 31.7 32.8 | 30 mn | 99% |
| 9 | aniline hydrochloride water | 80 60 60 | NO 50 l/h NO + N$_2$O$_3$$^{xx}$ r' = 20 recirculation NO 30 l/h | 2.64 g N$_2$O$_3$ | aniline hydrochloride water | 35.4 31.7 32.8 | 30 mn | 99% |

$^x$r = molar ratio $\frac{NO}{NO_2}$ $^{xx}$r' = molar ratio $\frac{NO}{N_2O_3}$ While the invention has been described in terms of various preferred embodiments, the skilled artisan will appreciate that various modifications, substitutions, omissions, and changes may be made without departing from the spirit thereof. Accordingly, it is intended that the scope of the preset invention be limited solely by the scope of the following claims.

What is claimed is:

1. In a process for the preparation of an aromatic azoamine, comprising diazotizing an aromatic amine, coupling the thus prepared diazonium salt with the aromatic amine, and thence rearranging the resulting aromatic diazoamine, the improvement which comprises effecting said diazotization, coupling and rearrangement reactions by introducing vaporous nitrogen oxides comprising an admixture of nitric oxide, NO$_1$, and nitrogen peroxide, NO$_2$, or nitrogen trioxide, N$_2$O$_3$, wherein the molar ratio of said nitric oxide to said nitrogen peroxide or nitrogen trioxide is between about 2:1 and about 100:1, to a reaction medium including the aromatic amine [α], a salt of the aromatic amine [β], and water [γ], with the percentage weight relationship existing among the components α, β and γ being such that:

$10 < \alpha < 70$ $13 < \beta$ $5 < \gamma$ $\alpha + \beta + \gamma = 100$.

2. The process as defined by claim 1, the several reactions being conducted in a single stage.

3. The process as defined by claim 1, the aromatic amine being aniline, the aromatic amine salt being aniline hydrochloride and the resultant aromatic azoamine being p-aminoazobenzene.

4. The process as defined by claim 1, the percentage weight relationship existing among the components α, β and γ being within that area bounded by the perimeter ABCDEA illustrated in FIG. 1 of the drawings.

5. The process as defined by claim 1, the percentage weight relationship existing among the components α, β and γ being within that area bounded by the perimeter AB'C'D'A in FIG. 1 of the drawings.

6. The process as defined by claim 1, the percentage weight relationship existing among the components α, β and γ being within that area bounded by the perimeter AB$_1$C$_1$D$_1$A in FIG. 2 of the drawings.

7. The process as defined by claim 1, the percentage weight relationship existing among the components α, β and γ being within that area bounded by the perimeter A'B'$_1$C'$_1$D'$_1$A' in FIG. 2 of the drawings.

8. The process as defined by claim 1, the aromatic amine being aniline, the aromatic amine salt being aniline nitrate and the resultant aromatic azoamine being p-aminoazobenzene.

9. The process as defined by claim 2, wherein the relationship of vaporous diazotizing agent to aromatic amine is that per 1000 total grams of aromatic amine/aromatic amine salt/water reaction mixture, from 0.05 to 1 equivalent diazotizing agent is introduced.

10. The process as defined by claim 1, wherein the relationship of vaporous diazotizing agent to aromatic amine and aromatic amine salt is as follows:

$$5 < \frac{\text{aromatic amine equivalents}}{\text{diazotizing agent}} < 30$$

$$1 < \frac{\text{aromatic amine salt equivalents}}{\text{diazotizing agent}} < 30$$

11. The process as defined by claim 1, further comprising extracting the reaction mixture with a member selected from the group consisting of an aliphatic hydrocarbon and an aromatic hydrocarbon.

12. The process as defined by claim 1, wherein the aromatic amine is selected from the group consisting of ortho- meta- and para-toluidine, naphthylamine, haloaniline, and alkylaniline, said alkyl comprising one or two nuclear substitutents having from 1 to 4 carbon atoms.

13. The process as defined by claim 1, wherein the yield of aromatic azoamine is essentially quantitative.

* * * * *